United States Patent
Prabhakar et al.

(10) Patent No.: US 11,093,310 B2
(45) Date of Patent: Aug. 17, 2021

(54) FLOW BASED PATTERN INTELLIGENT MONITORING SYSTEM

(71) Applicant: PayPal, Inc., San Jose, CA (US)

(72) Inventors: Vikas Prabhakar, San Jose, CA (US); Min Huang, Los Gatos, CA (US); Shanmugasundaram Alagumuthu, Milpitas, CA (US); Libao Cao, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 272 days.

(21) Appl. No.: 16/237,138

(22) Filed: Dec. 31, 2018

(65) Prior Publication Data

US 2020/0210260 A1 Jul. 2, 2020

(51) Int. Cl.
| | |
|---|---|
| *G06F 11/00* | (2006.01) |
| *G06F 11/07* | (2006.01) |
| *H04L 12/26* | (2006.01) |
| *G06Q 20/40* | (2012.01) |
| *G06F 11/34* | (2006.01) |

(52) U.S. Cl.
CPC ...... *G06F 11/0709* (2013.01); *G06F 11/0754* (2013.01); *G06F 11/3476* (2013.01); *G06Q 20/4093* (2013.01); *H04L 43/04* (2013.01); *H04L 43/067* (2013.01)

(58) Field of Classification Search
CPC ............. G06F 11/0709; G06F 11/0754; G06F 11/0757; G06F 11/076; G06F 11/3452; G06F 11/3476

See application file for complete search history.

(56) References Cited

U.S. PATENT DOCUMENTS

| | | | | |
|---|---|---|---|---|
| 7,526,670 B2* | 4/2009 | Lloyd | ................ | G06F 11/3447 |
| | | | | 714/4.1 |
| 8,788,445 B2* | 7/2014 | Hueter | ............... | G06Q 30/0204 |
| | | | | 706/45 |
| 9,026,644 B2* | 5/2015 | Parker | .................. | H04L 43/022 |
| | | | | 709/224 |
| 10,198,339 B2* | 2/2019 | Salunke | .................. | G06F 11/34 |
| 10,210,038 B2* | 2/2019 | Sasturkar | .............. | G06F 11/327 |
| 10,644,947 B2* | 5/2020 | Goel | .................. | G06F 11/3006 |
| 2010/0083054 A1* | 4/2010 | Marvasti | ............. | G06F 11/0709 |
| | | | | 714/47.2 |

(Continued)

*Primary Examiner* — Elmira Mehrmanesh
(74) *Attorney, Agent, or Firm* — Haynes and Boone, LLP

(57) ABSTRACT

Systems, methods, and computer program products for identifying a data pattern change anomaly uses a distributing computing environment that processes thousands of different data flows are provided. Numerous data flows are collected from the application computing environment over a configurable time period. The flows are aggregated into aggregated data according to at least one attribute from the flows and without losing information included in the flows. Historical data that includes aggregated data from multiple flows that occurred prior to a time during which the numerous data flows were collected is provided from a distributed disk storage. An anomaly that indicates change in data patterns in the flows is identified by comparing the aggregated data to the historical data using one or more models that are tailored to the numerous flows. An alert that includes an anomaly and a reason for an anomaly is transmitted and recorded in the system.

20 Claims, 4 Drawing Sheets

(56) References Cited

U.S. PATENT DOCUMENTS

| | | | |
|---|---|---|---|
| 2010/0169192 A1* | 7/2010 | Zoldi | G06Q 40/12 |
| | | | 705/30 |
| 2012/0136676 A1* | 5/2012 | Goodall | G06Q 10/063 |
| | | | 705/2 |
| 2015/0186436 A1* | 7/2015 | Kumar | G06F 16/2228 |
| | | | 707/741 |
| 2016/0283307 A1* | 9/2016 | Takeshima | G06F 11/0709 |
| 2016/0359872 A1* | 12/2016 | Yadav | H04L 43/04 |
| 2017/0126475 A1* | 5/2017 | Mahkonen | H04L 43/04 |
| 2018/0034685 A1* | 2/2018 | Naous | H04L 41/22 |
| 2018/0039555 A1* | 2/2018 | Salunke | G06F 11/3034 |
| 2019/0050564 A1* | 2/2019 | Pogorelik | G06F 21/554 |
| 2019/0095988 A1* | 3/2019 | Zoldi | G06Q 40/00 |
| 2019/0188721 A1* | 6/2019 | Wiese | G07F 19/206 |
| 2019/0207962 A1* | 7/2019 | Wang | G06F 11/0754 |
| 2020/0007566 A1* | 1/2020 | Wu | H04L 63/1433 |
| 2020/0169483 A1* | 5/2020 | Kursun | G06Q 20/38 |

* cited by examiner

FLOW BASED PATTERN INTELLIGENT MONITORING SYSTEM

TECHNICAL FIELD

The disclosure generally relates to techniques for detecting anomalies in a computer system.

BACKGROUND

In a system that has thousands of data flows, modification to software that processes the flows may result in unexpected pattern changes to the data in the flows. Because there are thousands of different flows and because the system may still process the flows without generating system errors or warning messages irrespective of the data changes in the flows, conventional monitoring systems do not detect the unexpected changes to the data flows in real time.

Figure 1:
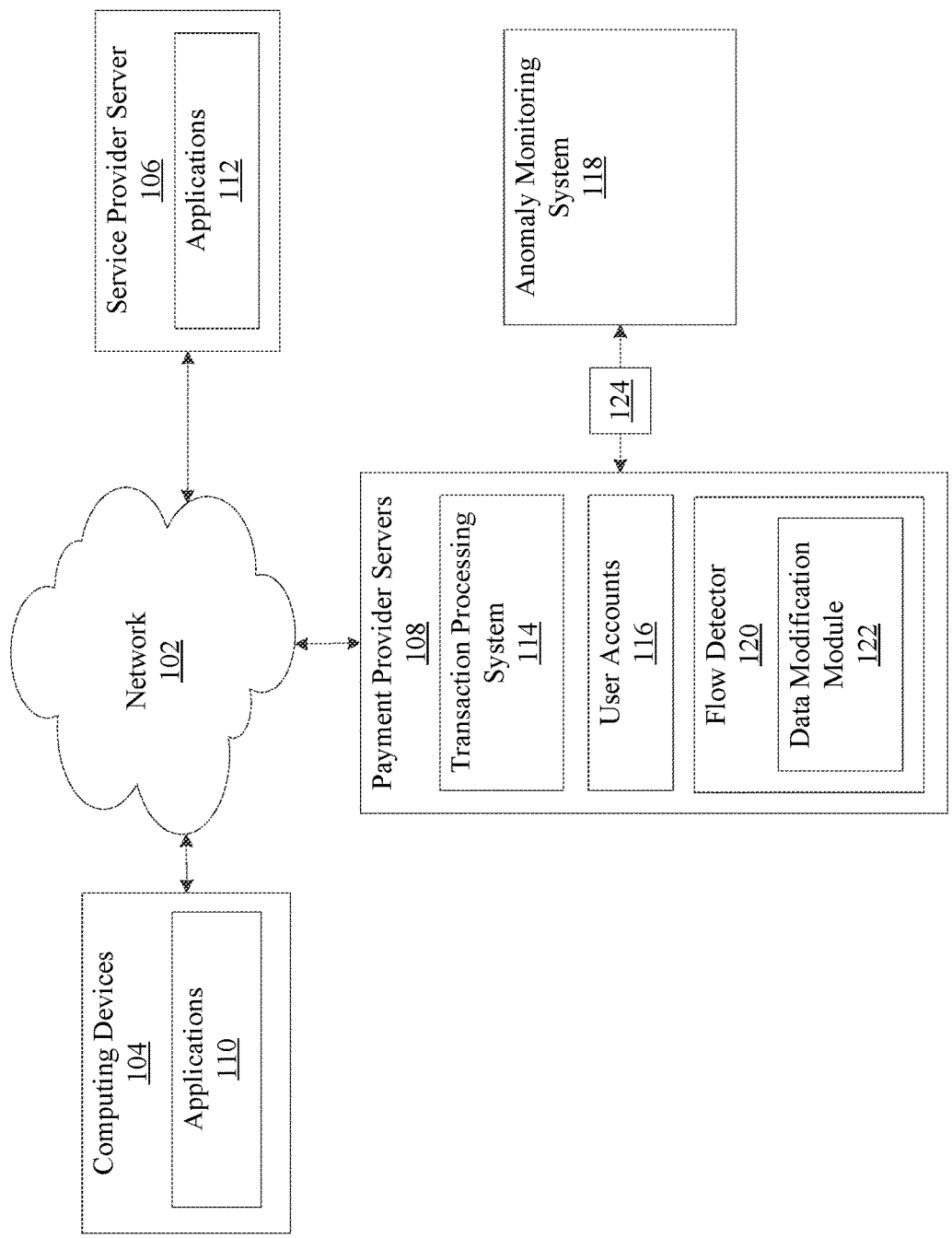
FIG. 1 is an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Numerous data flows exist in a distributed computing environment, such as an application service environment, that includes multiple computing devices. When a new software version is uploaded to one or more computing devices, the new software version may change data in a portion of the flows without adversely affecting the functionality of the system. Because the system continues to function as intended and because of numerous flows that are processed by the system, the unexpected pattern changes to the data in the flows are difficult to detect in real time.

An anomaly monitoring system incorporated into the distributed computing environment may detect anomalies in the data flows. The anomaly monitoring system may be incorporated into the computing components and may monitor the data flows in real time to determine the data flow trends and anomalies that deviate from these trends. The anomaly monitoring system may monitor different types of flows that include different data and different attributes. The anomaly monitoring system may append trends in the data flows to the historical trends for configurable time interval. Finally, the anomaly monitoring system may include various models that compare the data flow trends to the historical data flow trends and determine anomalies to the data flow trends that may be caused by new software that is added to one or more computing devices in the distributed system.

Further description of the embodiments in discussed below.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network.

Various components that are accessible to network 102 may be computing device(s) 104, service provider server(s) 106, and payment provider server(s) 108. Computing devices 104 may be portable and non-portable electronic devices under the control of a user and configured to transmit, receive, and manipulate data from service provider server(s) 106 and payment provider server(s) 108 over network 102. Example computing devices 104 include desktop computers, laptop computers, tablets, smartphones, wearable computing devices, eyeglasses that incorporate computing devices, implantable computing devices, etc.

Computing devices 104 may include one or more applications 110. Applications 110 may be pre-installed on the computing devices 104, installed on the computing devices 104 using portable memory storage devices, such as compact disks or thumb-drives, or be downloaded to the computing devices 104 from service provider server(s) 106 and/or payment provider server(s) 108. Applications 110 may execute on computing devices 104 and receive instructions and data from a user, from service provider server(s) 106, and payment provider server(s) 108.

Example applications 110 may be payment transaction applications. Payment transaction applications may be configured to transfer money world-wide, receive payments for goods and services, manage money spending, etc. Further, applications 110 may be under an ownership or control of a payment service provider, such as PAYPAL®, Inc. of San Jose, Calif., USA, a telephonic service provider, a social networking service provider, and/or other service providers. Applications 110 may also be analytics applications. Analytics applications perform business logic, provide services, and measure and improve performance of services and functions of other applications that execute on computing devices 104 based on current and historical data. Applications 110 may also be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102, and the like. Applications 110 may be location detection applications, such as a mapping, compass, and/or global positioning system (GPS) applications, social networking applications and/or merchant applications. Additionally, applications 110 may be service applications that permit a user of computing device 104 to receive, request and/or view information for products and/or services, and also permit the user to purchase the selected products and/or services.

In an embodiment, applications 110 may utilize numerous components included in computing device 104 to receive input, store and display data, and communicate with network 102. Example components are discussed in detail in FIG. 4.

As discussed above, one or more service provider servers 106 may be connected to network 102. Service provider server 106 may also be maintained by a service provider, such as PAYPAL®, a telephonic service provider, social networking service, and/or other service providers. Service provider server 106 may be software that executes on a computing device configured for large scale processing and that provides functionality to other computer programs, such as applications 110 and applications 112 discussed below.

In an embodiment, service provider server 106 may initiate and direct execution of applications 112. Applications 112 may be counterparts to applications 110 executing on computing devices 104 and may process transactions at the requests of applications 110. For example, applications 112 may be financial services applications configured to transfer money world-wide, receive payments for goods and services, manage money spending, etc., that receive message from the financial services applications executing on computing device 104. Applications 112 may be security applications configured to implement client-side security features or programmatic client applications for interfacing with appropriate application programming interfaces (APIs) over network 102. Applications 112 may be communication applications that perform email, texting, voice, and instant messaging functions that allow a user to send and receive emails, calls, texts, and other notifications over network 102. In yet another embodiment, applications 112 may be location detection applications, such as a mapping, compass, and/or GPS applications. In yet another embodiment, applications 112 may also be incorporated into social networking applications and/or merchant applications.

In an embodiment, applications 110 and applications 112 may process transactions on behalf of a user. In some embodiments, to process transactions, applications 110, 112 may request payments for processing the transactions via payment provider server(s) 108. For instance, payment provider server 108 may be a software application that is configured to receive requests from applications 110, 112 that cause the payment provider server 108 to transfer funds of a user using application 110 to service provider associated with application 112. Thus, applications 110 and 112 may receive user data, including user authentication data, for processing any number of electronic transactions, such as through payment provider server 108.

In an embodiment, payment provider servers 108 may be maintained by a payment provider, such as PAYPAL®. Other payment provider servers 108 may be maintained by or include a merchant, financial services provider, credit card provider, bank, and/or other payment provider, which may provide user account services and/or payment services to a user. Although payment provider servers 108 are described as separate from service provider server 106, it is understood that one or more of payment provider servers 108 may include services offered by service provider server 106 and vice versa.

Each payment provider server 108 may include a transaction processing system 114. Transaction processing system 114 may correspond to processes, procedures, and/or applications executable by a hardware processor. In an embodiment, transaction processing system 114 may be configured to receive information from one or more applications 110 executing on computing devices 104 and/or applications 112 executing on service provider server 106 for processing and completion of financial transactions. Financial transactions may include financial information corresponding to user debit/credit card information, checking account information, a user account (e.g., payment account with a payment provider server 108), or other payment information. Transaction processing system 114 may complete the financial transaction for the purchase request by providing payment to application 112 executing on service provider server 106.

Payment provider server 108 may also include user accounts 116. Each user account 116 may be established by one or more users using applications 110 with payment provider server 108 to facilitate payment for goods and/or services offered by applications 112. User accounts 116 may include user information, such as name, address, birthdate, payment/funding information, travel information, additional user financial information, and/or other desired user data. In a further embodiment, user accounts 116 may be stored in a database or another memory storage described in detail in FIG. 4.

In an embodiment, numerous data flows or simply flows may pass through system 100. A data flow may be a flow of data in system 100 from a source computing device to a destination computing device. An example data flow in system 100 may be a request for payment from application 110 to payment provider server 108 for a product or service offered by application 112 that executes on service provider server 106, the transaction that results in a payment between user accounts 116 of a user of application 110 and a service or product provider of application 112, and a response to a request for payment from payment provider server 108 to application 110. Further, there may be numerous variations to the example data flow above. The variations may be due to different financial instruments that may be used as payment in the flow, different countries where the transaction may be conducted and rules that are associated with the countries, different currencies that may be involved in the transaction and the conversion between the currencies, different products or services that may be purchased, etc. Accordingly, in system 100 that processes data flows worldwide, there may be thousands of different types of flows and millions of flows that may be processed by system 100 at any given hour.

Because system 100 may process thousands of different types of flows, there is a need to determine if there are anomalies with the one or more types of flows. The anomalies may occur when there is change to one or more components in system 100. The change may occur when there is a new software release of one of the system components, such as transaction processing system 114, that may affect data patterns in some flows, but not all flows. For example, a new version of transaction processing system 114 that may be released on payment provider server 108 that processes transactions for Germany may cause a number of flows that include a credit card as a financial instrument to drop to 30%, whereas with the previous version the transactions with a credit card as a financial instrument constituted 80%. These types of issues are difficult to detect for several reasons. First, payment provider server 108 may continue to process the transactions that are included in the flow because the difference in the number of transactions that are being processed using a credit card does not constitute a system error and payment provider server 108 may not generate a warning or an alert. Second, because the flows that use Germany as a country code make up a small fraction of the total number of the flows in system 100, the drop in the flows that include a credit card as a financial instrument may be too miniscule to identify in real time manually or by a system administrator.

However, the anomalies may have an adverse effect on a payment provider. For example, the payment provider may prefer the flows to include a credit card or a debit card as a financial instrument, rather than a token. This is because a credit card or a debit card provider may charge a processing fee, some of which may also be charged by the payment provider, while a token does not have a processing fee. Accordingly, the anomaly that causes the number of flows that have a credit card as a financial instrument to drop from 80% to 30% may be disadvantageous to the payment provider because the payment provider may lose money. In conventional systems the above anomaly may not be identified in real time; however, weeks or months later, the payment provider may be adversely affected by this change to flows resulting from a new software upgrade.

Notably, anomalies in flows discussed above are exemplary and there may be other anomalies and reasons to detect anomalies in system 100.

To determine anomalies in the flows, system 100 may include an anomaly monitoring system 118. Although shown as a single anomaly monitoring system 118, anomaly monitoring system 118 may be a distributed system and there may be multiple anomaly monitoring systems 118 that are included in various components in system 100. Anomaly monitoring system 118 may include a flow detector 120 that may be incorporated into one of components of system 100, such as payment provider server 108. Anomaly monitoring system 118 and flow detector 120 may be software modules that operate using computer components, such as those discussed in FIG. 4.

In an illustrated embodiment, flow detector 120 may be installed in payment provider server(s) 108 and may identify flows that are received by payment provider server(s) 108. Flow detector 120 may be configured to identify different flows using one or more attributes of the flow. Example attributes of the flow may be the financial instruments used in the flow, a product or service associated with the flow, a country where the transaction in the flow originates and/or ends, a type of a billing plan for the product or a service, etc. In another example, flow detector 120 may be configured to use multiple attributes to identify different flows. For example, flow detector 120 may be configured to identify different product flows using a financial instrument and country code attributes that are included in the flow. In some embodiments, flow detector 120 may detect flows that pass through the computing device or server where the flow detector 120 is installed. For example, flow detector 120 installed on payment provider server 108 may detect flows that pass through that payment provider server 108.

In an embodiment, system 100 may include a data modification module 122. Although shown to be within flow detector 120, data modification module 122 may also be coupled to flow detector 120. Data modification module 122 may also be a software module that may be stored in and may execute instructions or code using one or more components discussed in FIG. 4. Data modification module 122 may modify or remove one or more attributes in the flows detected using flow detector 120. For example, data modification module 122 may modify or remove one or more configurable attributes from the flow. An example attribute may be user information, financial instrument information, such as a credit card or a debit card number, user account information, etc. In this way, data modification module 122 may remove confidential or other information from the flows before the flows may be analyzed by anomaly monitoring system 118 and prevent the user information from being compromised.

In an embodiment, flow detector 120 may transmit the flows that passed through data modification module 122 as flows 124 to anomaly monitoring system 118 for anomaly detection and storage.

In an embodiment, anomaly monitoring system 118 may learn the behavior of flows 124 as anomaly monitoring system 118 receives flows 124. Anomaly monitoring system 118 may also identify current data trends from flows 124 and store the current data trends with historical trends that occurred over a configurable time interval. Anomaly monitoring system 118 may also compare the historical trends to the current data trends to identify anomalies. Anomaly monitoring system 118 may also generate an alert when anomaly monitoring system 118 detects an anomaly in the current data trends or anomaly in data patterns to a system administrator. In this way, anomaly monitoring system 118 may identify and alert a system administrator of an anomaly resulting from a new software version as the anomaly occurs in a portion of the flows in system 100 in real time.

Figure 2:
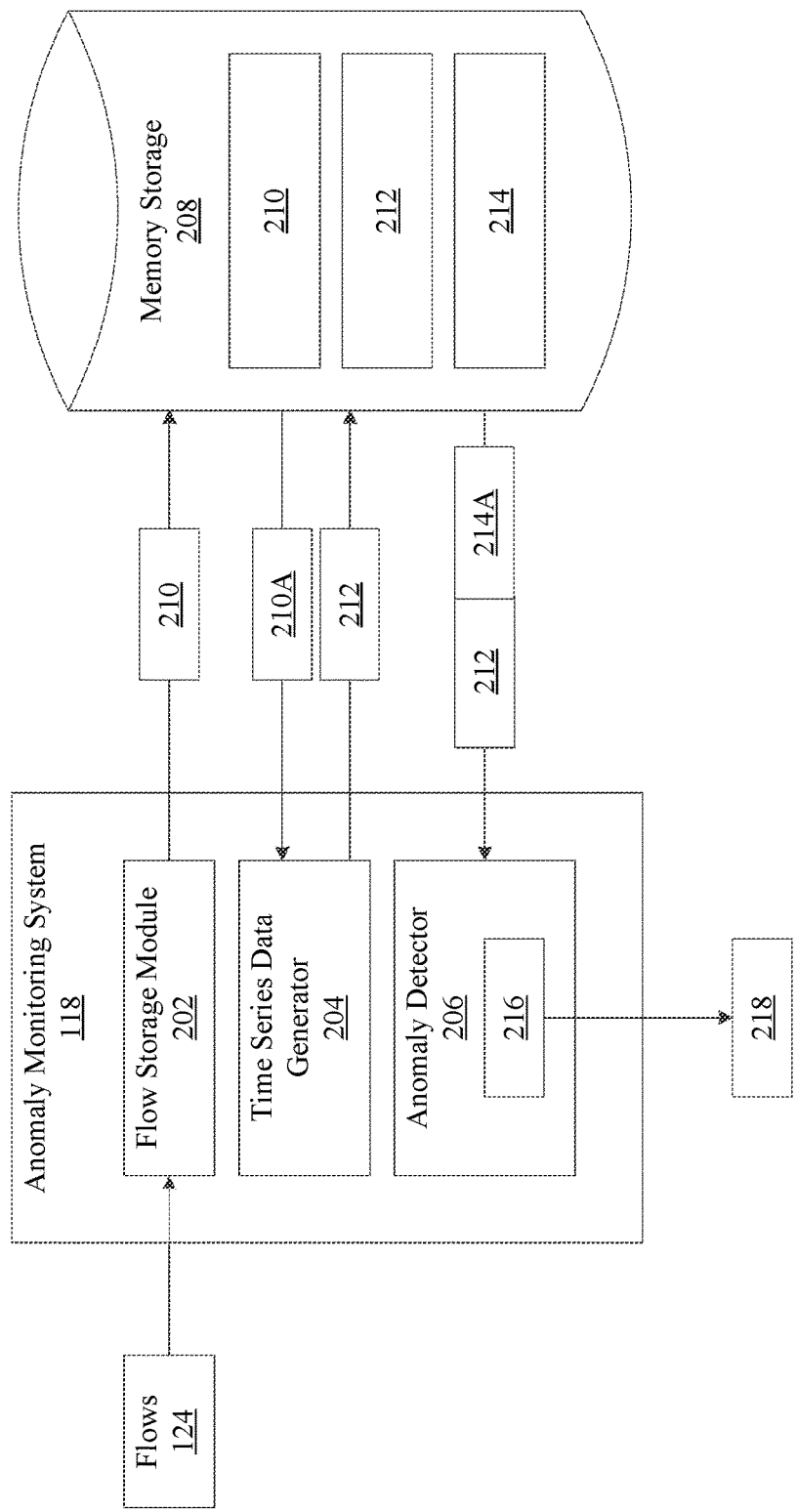
FIG. 2 is a block diagram of an anomaly monitoring system, according to an embodiment.

FIG. 2 is a block diagram 200 of an anomaly monitoring system, according to an embodiment. As illustrated in FIG. 2, anomaly monitoring system 118 may include a flow storage module 202, a time series data generator 204, and an anomaly detector 206.

In an embodiment, flow storage module 202 may receive flows 124 generated in system 100. Flow storage module 202 may be configured to receive flows 124 in real time, at preconfigured time intervals, in bursts, etc. Once flow storage module 202 receives flows 124, flow storage module 202 may generate raw data 210 from flows 124. Raw data 210 may be flows 124 or attributes that flow storage model 202 extracted from flows 124. In an embodiment, flow storage module 202 may store raw data 210 in memory storage 208. Memory storage 208 may be a disk storage, a distributed disk storage, a database or another memory conducive for a distributed large scale storage that is discussed in detail in FIG. 4. Because flow storage module 202 stores raw data 210 in memory storage 208 as soon as anomaly monitoring system 118 receives flows 124, raw data 210 includes data from the current flows in system 100. Further, memory storage 208 may receive raw data 210 from multiple anomaly monitoring systems 118 (not shown).

In an embodiment, time series data generator 204 may extract a portion of raw data 210A from raw data 210. Raw data 210A is raw data 210 that may have been stored in memory storage 208 over a configurable time interval, such as an hour. The extracted raw data 210A may be from multiple anomaly monitoring systems 118 (not shown). Further, once time series data generator 204 extracts raw data 210A, memory storage 208 or flow storage module 202 may track raw data 210A that have been extracted by time series data generator 204 such that the same raw data 210A is not subsequently extracted multiple times and re-analyzed for the same anomalies 210 by time series data generator 204. In some embodiments, flow storage module 202 may overwrite raw data 210A that time series data generator 204 extracted from memory storage 208 with new raw data that is received by anomaly monitoring system 118.

In an embodiment, time series data generator 204 may generate time series data 212 from raw data 210A. Time series data 212 may be raw data 210A that has been aggregated or condensed into interval data points instead of continuous points as in raw data 210A, but without losing data information included in the attributes of raw data 210A that anomaly detector 206 may use to identify an anomaly. Further, time series data 212 may be associated with a time stamp that reflects the time period when the raw data 210A was generated in system 100. For example, for each flow 124, raw data 210 may include attributes that indicate country code, currency, conversion rate, financial instrument, etc., of each flow 124. Because system 100 may generate millions of flows 124 each hour, there may be millions or billions of data points that flow storage module 202 may store in memory storage 208 as raw data 210 every hour. When time series data generator 204 retrieves and aggregates raw data 210A, time series data generator 204 may reduce the millions or billions of attributes in raw data 210 to time series data 212 that has several hundred data points that have the same composition as raw data 210.

In some embodiments, time series data generator 204 may aggregate raw data 210A into time series data 212 according to one attribute such as country code, or according to multiple attributes such as country code and financial instrument. However, because time series data 212 does not lose or minimize the loss of information that exists in raw data 210A, the percentage of occurrence of a particular country or country code and financial instrument in time series data 212 may be the same or approximately the same as the percentage in raw data 210A.

In one example, time series data generator 204 may receive raw data 210A from flows 124 that are associated with billing agreements. In these flows, application 112 may receive a one-time sign up request from application 110, and cause transaction processing system 114 to charge user account 116 associated with the use of application 110 on a periodic basis, such as, monthly basis. In this case, transaction processing system 114 may determine various financial instruments that may be included in user account 116, such as a token, a debit card, or a credit card. Transaction processing system 114 may also determine to automatically charge user account 116 first using tokens, then if the tokens do not have enough funds for a monthly charge, the debit card, and if the debit card does not have enough funds for a monthly charge, then a credit card. In this case, flow storage module 202 may receive flows 124 that are associated with the billing agreements of multiple user accounts 116, use the financial instrument attribute to identify raw data 210 that at least includes data points that identify which financial instrument transaction processing system 114 uses for the monthly charges and an identifier for a service or a product that is in a billing agreement. Time series data generator 204 may retrieve raw data 210A associated with the flows 124 for the billing agreements and may generate time series data 212. Time series data 212 may identify a percentage that each financial instrument was used in billing agreements over the first configurable time period, such as over a past hour.

In another example, flows 124 may include one or more attributes that identify whether a transaction processed using transaction processing system 114 is a cross-border transaction. In the cross-border transaction, a payor and a payee may be in different countries, and transaction processing system 114 may use a conversion rate to convert currency between the countries as the payment flows from payor to payee. Flow storage module 202 may store raw data 210 from flows 124 that includes a cross-border transaction as one of the attributes as flows 124 are received from system 100. Time series data generator 204 may aggregate raw data 210 according to a cross-border transaction attribute to determine time series data 212 that identifies a number of cross-border transactions that occurred over a first configurable time period. As discussed above, time series data 212 may also include a timestamp that identifies the time period during which the cross-border transactions occurred. Further, time series data 212 may identify the countries that were identified in the cross-border transaction and/or the respective currencies that transaction processing system 114 used in the cross-border transaction.

In an embodiment, once time series data generator 204 generates time series data 212, time series data generator 204 may store time series data 212 in memory storage 208. Typically, time series data 212 includes current trends that occur in system 100 and may include anomalies in system 100.

In an embodiment, time series data generator 204 may also aggregate (or cause memory storage 208 to aggregate) time series data 212 from multiple intervals into historical data 214. To aggregate time series data 212, time series data generator 204 may append time series data 212 to historical data 214 that exists in memory storage 208. Historical data 214 may be time series data 212 stored in memory storage 208 over a configurable time period, such as a month, several months, one hundred days, a year, etc. In an embodiment, time series data generator 204 may append time series data 212 to historical data 214 after anomaly detector 206 identifies anomalies in time series data 212, as will be discussed below.

In an embodiment, anomaly detector 206 may determine an anomaly in time series data 212 as compared to historical data 214. To determine an anomaly, anomaly detector 206 may retrieve time series data 212 from memory storage 208 (or from time series generator 204) and a portion of historical data 214A from memory storage 208. Anomaly detector 206 may compare the data points in time series data 212 with the data points in a portion of historical data 214A. The comparison may determine if the data points deviate from each other by some predetermined variation or threshold which may indicate an anomaly. The portion of historical data 214A may be historical data that covers the same time period as time series data 212 on a different day, week, month, etc. With respect to the billing agreement example described above, example deviation may be data points in historical data 214 that indicate that tokens were used as a method of payment 50% of the time, debit cards were used as a method of payment 40% of the time and credit cards were used as a method of payment 10% of the time. However, time series data 212 generated after a new version release on one of payment provider servers 108 may indicate that tokens were used as a method of payment 10% of the time, debit cards were used as a method of payment 10% of the time, and credit cards were used as a method of payment 80% of the time. In another example, suppose historical data 214A indicates that a method of payment that includes a credit card is used in a cross-border transaction 80% of the time. However, time series data 212 generated after a software upgrade on payment provider server 108 may indicate that a credit card is used as a method of payment in a cross-border transaction 30% of the time, thus indicating an anomaly.

In an embodiment, anomaly detector 206 may include one or more anomaly detection models 216, or simply models 216. Models 216 may be tailored to detect an anomaly in a particular flow 124 or particular attributes in flow 124. As discussed above, an anomaly may be a change in data patterns in flows 124. Models 216 may also be product or service specific. Models 216 may compare time series data 212 with historical data 214A from last week, month, the same time of the previous days, etc. Models 216 may also compare one or more data points in time series data 212 with historical data 214 using weighted scores for an hour, day, week, etc. New models 216 may be added to anomaly detector 206. In an embodiment, the output of models 216 may be deviation scores and reason codes, which may be used to generate alerts when the deviation scores are over or under a preconfigured threshold, as described below.

In an embodiment, model 216 may be a z-score model that determines whether time series data 212 deviates from the mean of historical data 214 by a given threshold. In the z-score model, if time series data 212 deviates by more than a threshold score from the mean of historical data 214, anomaly detector 206 may generate an alarm 218 as will be discussed below. An example z-score model may be as follows:

$$z=(x-\mu)/\sigma \quad \text{(Equation 1)}$$

where z is the z-score, x is the data to be evaluated (such as time series data 212), $\mu$, is a mean of historical data 214, and $\sigma$ is the standard deviation. The mean of historical data 214 may be determined using a simple moving average algorithm or an exponential moving average algorithm in some embodiments. In the simple moving algorithm, anomaly detector 206 may retrieve portion of historical data 214A over a fixed time period. Anomaly detector 206 may then determine a mean of portion of historical data 214A, where each data point contributes the same weight and variation to the mean calculation. In the exponential moving average, anomaly detector 206 may retrieve historical data 214A and determine the mean of historical data 214A by adjusting the weight of each data point in historical data 214A by a decay factor that causes the weight of each data point to decrease exponentially, but without reaching zero.

In an embodiment, model 216 may be a threshold model. In the threshold model, anomaly detector 206 may determine whether data points determined from raw data 210 have values that are below a lower threshold or are above an upper threshold. If the values are below the lower threshold or above the upper threshold, anomaly detector 206 may generate alert 218.

In another embodiment, model 216 may be an inter quartile range ("IQR") model. The inter quartile range model may determine the data points in historical data 214A that fall within the quarters, such as Q1, Q2, and Q3, where Q1 is a $25^{th}$ percentile, Q2 is a $50^{th}$ percentile, and Q3 is a $75^{th}$ percentile. The inter quartile range model may then determine the IQR as a difference between Q3 and Q1 (IQR=Q3−Q1). The inter quartile range model may further determine whether the data points in time series data 212 are outliers when, for example, the data points are below Q1−3*IQR or above Q3+3*IQR. If so, the inter quartile range model may generate alert 218.

In another embodiment, model 216 may take into account seasonal trends. For example, during holidays, such as Christmas and Thanksgiving, time series data 212 may indicate that anomaly exists, when a change exists due to a season rather than due to a change in system 100. In this case, models 216 may remove data that is associated with the seasonal trends from time series data 212 and historical data 214 and may not generate an alert 218.

As discussed above, anomaly detector 206 may generate alerts 218 when one of models 216 detects an anomaly. Because anomaly detector 206 uses time series data 212 to detect an anomaly, alert 218 may be generated in real-time as an anomaly occurs in flows 124, rather than weeks or months later as may be the case in other systems. An example alert 218 may include a deviation in the data points in time series data 212 and the reason for alert 218, such as whether the data points are too high, too low, or have never been seen before as compared to the data points in historical data 214. In another example, anomaly detector 206 may generate alert 218 in a form of an electronic email or a text message that includes a reason for alert 218.

Going back to FIG. 1, there are numerous benefits to anomaly monitoring system 118. Anomaly monitoring system 118 may be a distributed system that may operate on thousands computing devices 104 in system 100 and determine time series data 212 from numerous flows 124 in parallel. In this way, anomaly monitoring system 118 may process millions of flows 124 in real time. Further, flow storage module 202 may be configured to process different types of flows 124 and determine data points by configuring different attributes in flows 124 to be used as data points. Additionally, anomaly detector 206 may also include different models 216 to determine anomalies in time series data 212 in different ways. The weight of each model can be automatically adjusted as user feedback on the correctness of the alerts. Further models 216 may be removed or updated with new models depending on the needs in system 100.

Figure 3:
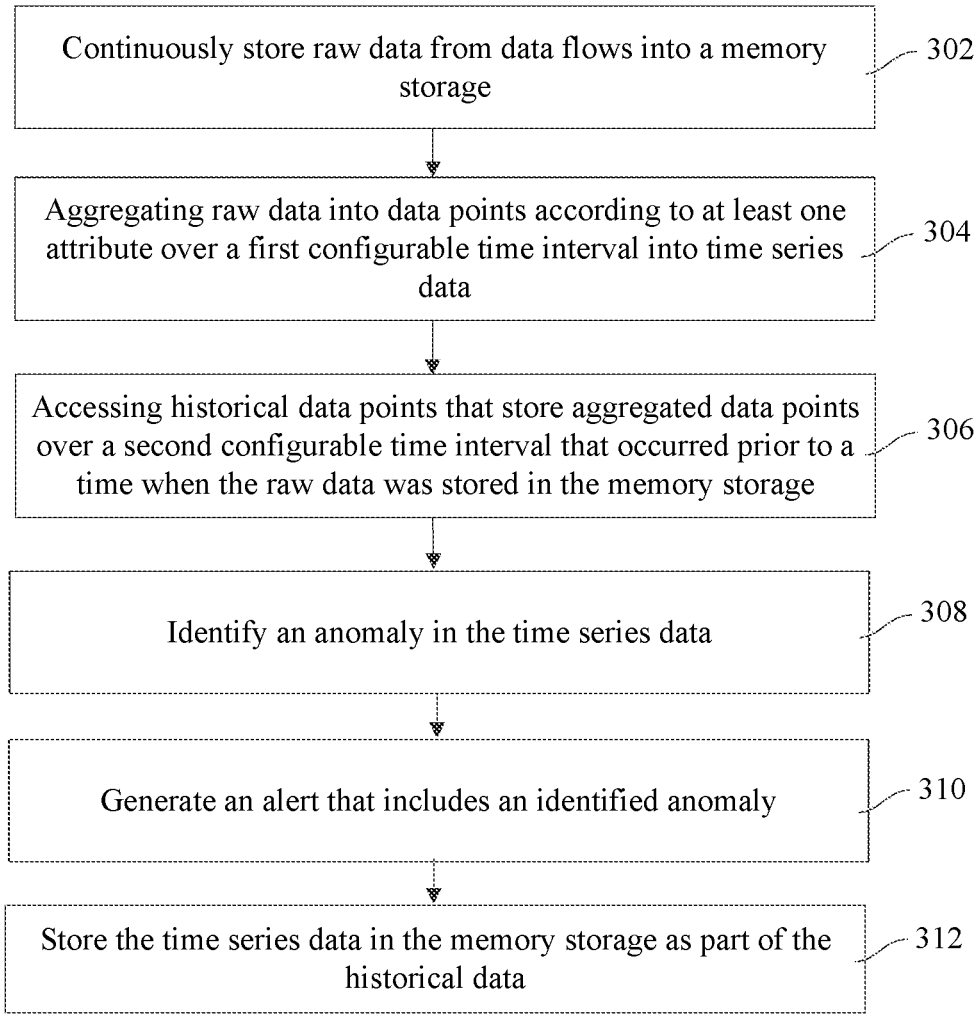
FIG. 3 is a flowchart of a method for detecting an anomaly in real-time, according to an embodiment.

FIG. 3 is a flowchart of a method 300 for determining an anomaly in real-time, according to an embodiment. Method 300 may be performed using hardware and/or software components described in FIGS. 1-2. Note that one or more of the operations may be deleted, combined, or performed in a different order as appropriate.

At operation 302, raw data is continuously received. For example, anomaly monitoring system 118 may receive flows 124 from payment provider server(s) 108 in system 100 and generate raw data 210 from flows 124. Raw data 210 may include some or all attributes in flows 124 or may be flows 124 and may include current data trends in system 100. As discussed above, flow storage module 202 may store raw data 210 in memory storage 208.

At operation 304, raw data is aggregated into time series data. For example, time series data generator 204 may retrieve raw data 210 from memory storage 208 that was collected over a first configurable time period. From raw data 210, time series generator 204 may generate time series data 212 that includes data points aggregated from raw data 210 using one or more attributes. As discussed above, time series data 212 does not lose information associated with data points included in raw data 210 that anomaly detector 206 may use to identify an anomaly.

At operation 306, historical data is accessed. For example, anomaly detector 206 may access a portion of historical data 214A from memory storage 208 that may be used to identify an anomaly in time series data 212. As discussed above, historical data 214 may include time series data 212 from multiple previous configurable time periods that time series data generator 204 had previously generated and aggregated as historical data 214. As discussed above, memory storage 208 may store historical data 214 that has been collected and aggregated over a second configurable time interval, such as 100 days.

At operation 308, an anomaly is identified. For example, anomaly detector 206 may use one or more models 216 and historical data 214 to identify anomalies in time series data 212. As discussed above, model 216 may be specific to identifying anomalies in particular flows 124 and may be removed or replaced with different models.

At operation 310, an alert is generated. For example, anomaly detector 206 may generate alert 218 that includes an anomaly, such as a deviation from historical data 214 and a reason for the anomaly. As discussed above, in some embodiments, the anomaly alerts may be included in an email that is transmitted to a system administrator, instead of the system administrator monitoring or querying the system to get the anomaly alerts.

At operation 312, time series data is stored as historical data. For example, time series data module 204 may append time series data 212 to historical data 214. In this way, time series data 212 may be used to determine anomalies in future flows 124.

Figure 4:
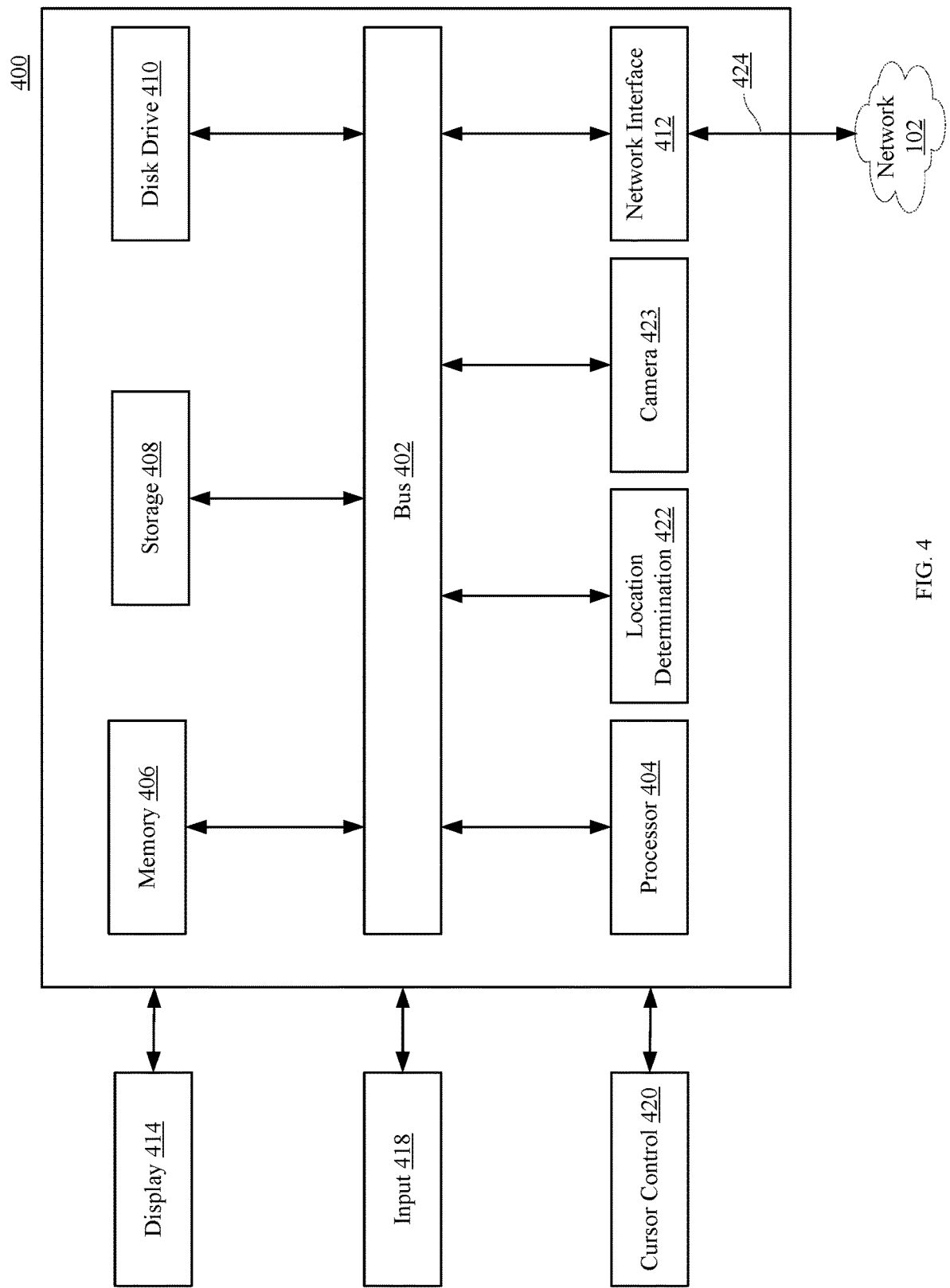
FIG. 4 is a block diagram of a computer system suitable for implementing one or more components or operations in FIGS. 1-3 according to an embodiment.

Referring now to FIG. 4 an embodiment of a computer system 400 suitable for implementing, the systems and methods described in FIGS. 1-3 is illustrated.

In accordance with various embodiments of the disclosure, computer system 400, such as a computer and/or a server, includes a bus 402 or other communication mechanism for communicating information, which interconnects subsystems and components, such as a processing component 404 (e.g., processor, micro-controller, digital signal processor (DSP), graphics processing unit (GPU), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), a location determination component 422 (e.g., a Global Positioning System (GPS) device as illustrated, a cell tower triangulation device, and/or a variety of other location determination devices known in the art), and/or a camera component 423. In one implementation, the disk drive component 410 may comprise a database having one or more disk drive components.

In accordance with embodiments of the disclosure, the computer system 400 performs specific operations by the processor 404 executing one or more sequences of instructions contained in the memory component 406, such as described herein with respect to the mobile communications devices, mobile devices, and/or servers. Such instructions may be read into the system memory component 406 from another computer readable medium, such as the static storage component 408 or the disk drive component 410. In other embodiments, hard-wired circuitry may be used in place of or in combination with software instructions to implement the disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 400. In various other embodiments of the disclosure, a plurality of the computer systems 400 coupled by a communication link 424 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method for determining an anomaly in a distributed system, the method comprising:

accessing, from a memory storage, a plurality of data flows, each data flow of the plurality of data flows including a plurality of attributes that were collected into a distributed computing system over a configurable time interval;

aggregating data in the plurality of data flows according to a subset of attributes in the plurality of attributes, wherein a proportion of values in the subset of attributes in the aggregated data is approximately the same as a proportion of values in the subset of attributes in the data in the plurality of data flows;
accessing historical data, wherein the historical data includes aggregated data from a plurality of time intervals that occurred prior to a time during which the plurality of data flows was collected;
identifying the anomaly by determining, in real-time, that the aggregated data deviates from the historical data by a predetermined threshold; and
generating an alert that includes the anomaly.

2. The method of claim 1, further comprising:
storing the aggregated data as part of the historical data, wherein the historical data includes the aggregated data from the configurable time interval and aggregated data from the plurality of the prior time intervals.

3. The method of claim 2, wherein the historical data is stored in a data store for a second configurable time interval.

4. The method of claim 1, wherein a data flow in the plurality of data flows identifies a flow of data through the distributed system from a source to a destination and wherein the plurality of data flows includes different types of data flows.

5. The method of claim 1, further comprising:
identifying a plurality of instrument types in an attribute in the subset of attributes; and
determining that a percentage that each instrument type in the plurality of instrument types occurs in the aggregated data is approximately the same as a percentage that each instrument type occurs in the plurality of data flows,
wherein the aggregating is further according to the plurality of instrument types over the configurable time interval.

6. The method of claim 1, wherein an attribute in the subset of attributes identifies a cross-border transaction.

7. The method of claim 1, wherein an attribute in the subset of attributes identifies an instrument type in a plurality of instrument types.

8. The method of claim 1, further comprising:
identifying an attribute in the plurality of data flows; and
masking data that corresponds to the attribute.

9. The method of claim 1, further comprising:
determining a subset of data from the historical data that was aggregated during a time interval in the plurality of time intervals; and
comparing the subset data against the aggregated data.

10. The method of claim 1, further comprising:
determining a subset of data from the historical data, wherein the subset of data has been aggregated during a second configurable time interval;
weighing the subset of data according to criteria; and
comparing the weighted subset of data and the aggregated data.

11. The method of claim 1, wherein the alert includes a deviation between the aggregated data and the historical data and a reason code.

12. A system for determining an anomaly in a distributed processing system, the system comprising:
a non-transitory memory storing instructions; and
one or more hardware processors coupled to the non-transitory memory and configured to read the instructions from the non-transitory memory to cause the system to perform operations comprising:
accessing, from a memory storage a plurality of data flows, each data flow of the plurality of data flows including a plurality of attributes that were collected in a distributed computing system over a configurable time interval;
aggregating data in the plurality of data flows according to a first attribute and a second attribute in the plurality of attributes, wherein a proportion of values in the first attribute and the second attribute in the aggregated data is approximately the same as a proportion of values in the first attribute and the second attribute in the data in the plurality of data flows;
accessing historical data, wherein the historical data includes aggregated data from a plurality of time intervals that occurred prior to a time during which the plurality of data flows was collected;
identifying the anomaly by determining, in real-time, that the aggregated data deviates from the historical data by a predetermined threshold; and
generating an alert that includes the anomaly.

13. The system of claim 12, wherein the operations further comprise:
appending the aggregated data to the historical data, wherein the stored historical data includes the aggregated data from the configurable time interval and aggregated data from the plurality of the prior time intervals.

14. The system of claim 12, wherein the operations further comprise:
identifying the first attribute that is an instrument; and
determining a percentage that each instrument type that occurs in the aggregated data is approximately the same as a percentage that each instrument type occurs in the plurality of data flows, wherein the aggregating is further according to different types of the instrument and wherein the aggregating occurs over the configurable time interval.

15. The system of claim 12, wherein the operations further comprise:
identifying a third attribute in the plurality of data flows; and
masking data that corresponds to the third attribute.

16. The system of claim 12, wherein the operations further comprise:
determining a subset of data from the historical data that was aggregated during a time interval in the plurality of time intervals; and
comparing the subset data against the aggregated data.

17. The system of claim 12, wherein the operations further comprise:
determining a subset of data from the historical data, wherein the subset of data has been aggregated during a second configurable time interval;
weighing the subset of data according to criteria; and
comparing the weighted subset of data and the aggregated data.

18. The system of claim 12, wherein the alert includes a deviation between the aggregated data and the historical data and a reason code.

19. A non-transitory machine-readable medium having stored thereon machine-readable instructions executable to cause a machine to perform operations comprising:
accessing, from a memory storage a plurality of data flows, each data flow of the plurality of data flows including a plurality of attributes that were collected in a distributed computing system over a configurable time interval;

aggregating the plurality of data flows according to a subset of attributes in the plurality of attributes, wherein a proportion of values in the subset of attributes in the aggregated data is approximately the same as a proportion of values in the subset of attributes in the data in the plurality of data flows;

accessing historical data, wherein the historical data includes aggregated data from a plurality of time intervals that occurred prior to a time during which the plurality of data flows was collected;

identifying an anomaly by determining, in real-time, that the aggregated data deviates from the historical data by a predetermined threshold, wherein the identifying the anomaly utilizes at least one model in a plurality of models; and generating an alert that includes the anomaly and a reason for the anomaly.

20. The non-transitory machine-readable medium of claim 19, wherein the operations further comprise:

identifying a first attribute in the subset of attributes that is an instrument; and determining that a percentage that each instrument type that occurs in the aggregated data is approximately the same as a percentage that each instrument type occurs in the plurality of data flows, wherein the aggregating is further according to different types of the instrument and wherein the aggregating occurs over the configurable time interval.

* * * * *

UNITED STATES PATENT AND TRADEMARK OFFICE
CERTIFICATE OF CORRECTION

PATENT NO. : 11,093,310 B2  
APPLICATION NO. : 16/237138  
DATED : August 17, 2021  
INVENTOR(S) : Vikas Prabhakar et al.

Page 1 of 1

It is certified that error appears in the above-identified patent and that said Letters Patent is hereby corrected as shown below:

In the Claims

At Column 15, Line 2: Please replace "plurality of attributes" with "plurality of attributes into aggregated data"

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*